(No Model.) 2 Sheets—Sheet 1.

C. D. MATHENY.
AUTOMATIC DUMP FOR UNLOADING CARS.

No. 527,868. Patented Oct. 23, 1894.

Witnesses
J. N. Lang
L. G. Kelsey Jr.

Inventor.
C. D. Matheny
by H. L. Reynolds
his atty.

THE NORRIS PETERS CO., PHOTO-LITHO., WASHINGTON, D. C.

(No Model.) 2 Sheets—Sheet 2.

C. D. MATHENY.
AUTOMATIC DUMP FOR UNLOADING CARS.

No. 527,868. Patented Oct. 23, 1894.

Witnesses.
J. N. Lang
L. G. Kelsey Jr.

Inventor.
C. D. Matheny
by H. L. Reynolds
his atty.

UNITED STATES PATENT OFFICE.

CICERO D. MATHENY, OF SEATTLE, WASHINGTON.

AUTOMATIC DUMP FOR UNLOADING CARS.

SPECIFICATION forming part of Letters Patent No. 527,868, dated October 23, 1894.

Application filed August 19, 1893. Serial No. 483,548. (No model.)

*To all whom it may concern:*

Be it known that I, CICERO D. MATHENY, a citizen of the United States, residing at Seattle, in the county of King and State of Washington, have invented certain new and useful Improvements in Automatic Dumps for Unloading Cars; and I do hereby declare the following to be a full, clear, and exact description of the invention, such as will enable others skilled in the art to which it appertains to make and use the same.

My invention consists of a dump for unloading cars. It is more particularly designed for unloading logging trucks but may also be used for unloading coal, grain and all similar commodities which are carried in bulk, it being understood that a car constructed for dumping is used.

The particular construction of my device will be seen by reference to the specification following, reference being had to the drawings which form a part thereof.

Figure 1:
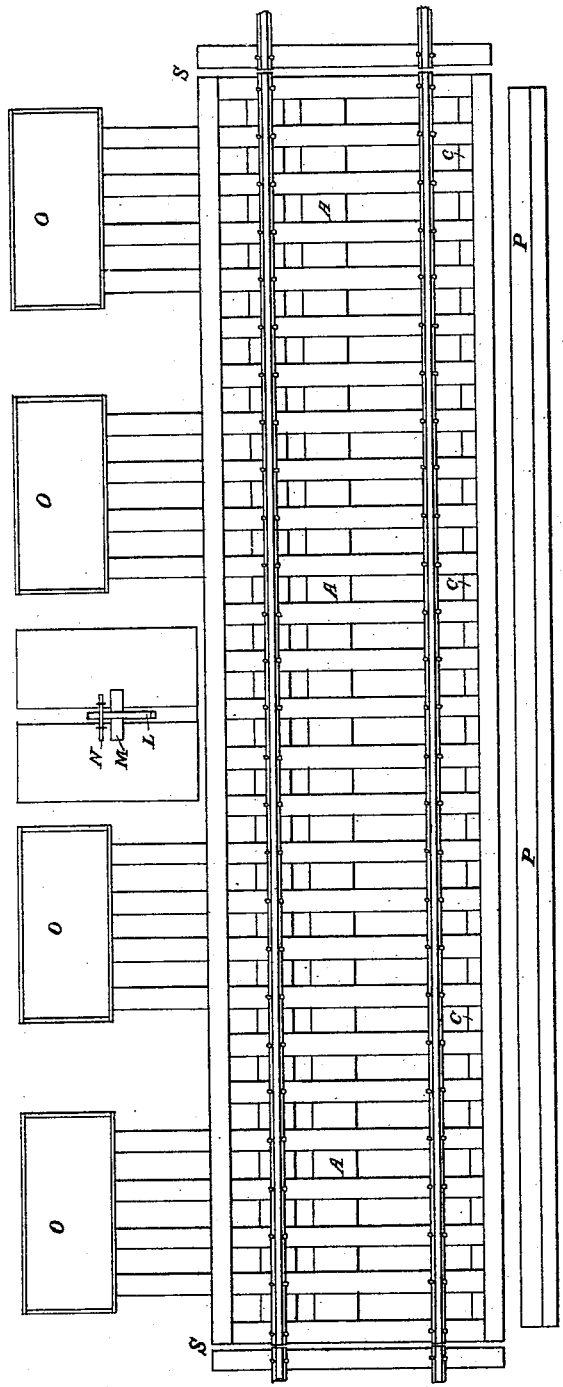
Figure 2:
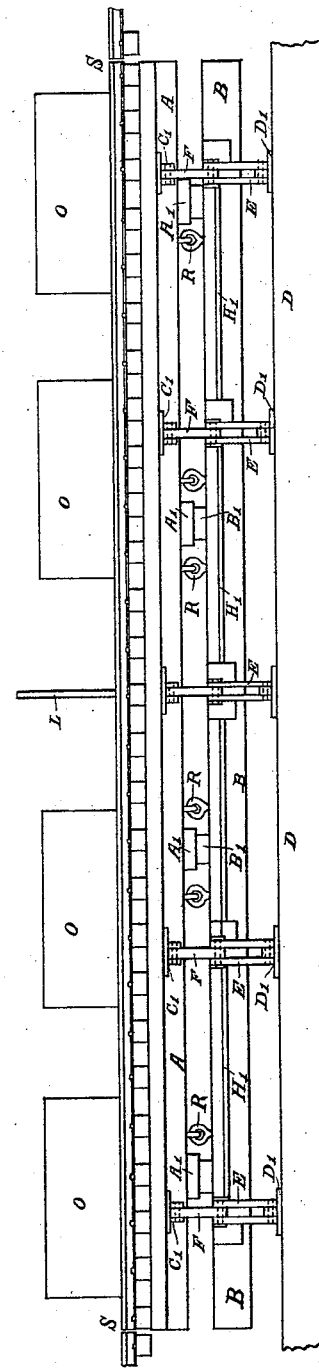
Figure 3:
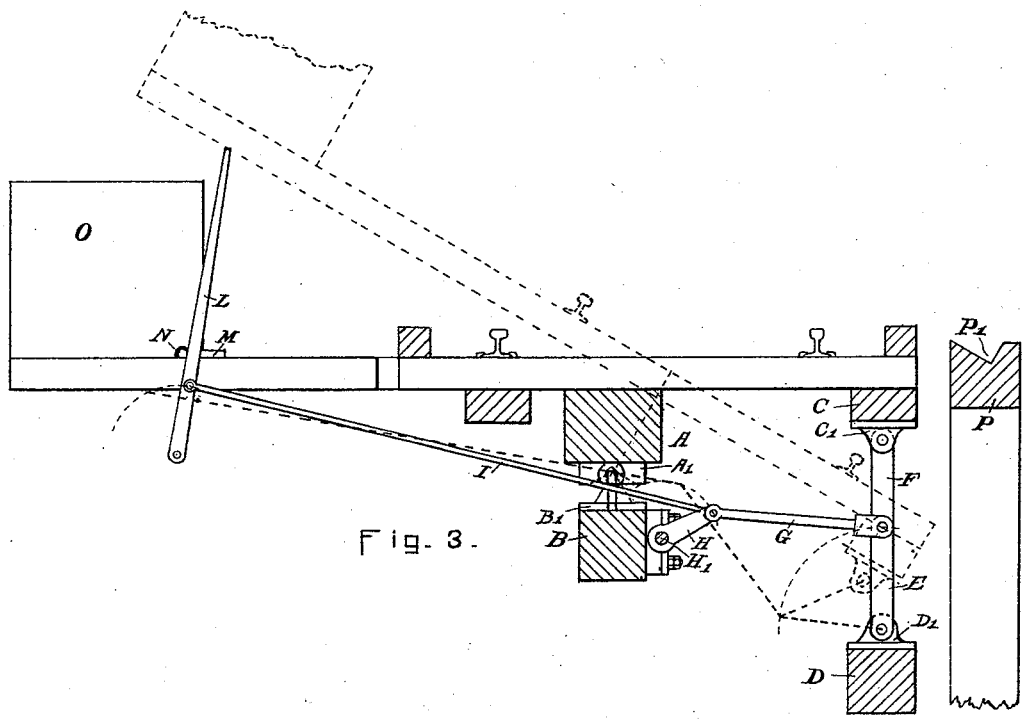

Figure 1, is a plan view of my dump. Fig. 2, is a side elevation. Fig. 3, is a cross section at right angles to both Figs. 1 and 2.

A section of track from S, to S, long enough to hold one or more of the cars to be dumped, is supported upon the beams A, and C. The beam A, is placed a little to one side of the center of the space between the track rails and is supported at convenient distances upon pivots or bearings. I have shown these bearings as knife edge bearings composed of the blocks B', and A'. Instead of the knife bearings ordinary pin bearings may be used.

The beam C, which is under the outer ends of the ties or under the outer rail, is supported by a number of toggle joints composed of the members E, and F, which are pivoted to each other and to the blocks D', and C', attached respectively to the foundation beam D, and the beam C. To the centers of these toggle joints are pivoted the rods G, which are attached at their other ends to cranks H, upon the shaft H', which extends throughout the length of the dump. To the center one of these cranks is attached the rod I, which is also attached to the operating lever L. This lever is held in its place by any form of locking device. I have shown a stop M, which limits its motion in one direction and a couple of staples N, in which may be inserted the stick which will hold the lever against the stop M. As many of the ties as are found necessary are extended on the rear side of the dump to support counter weights which I have illustrated as boxes O, which may contain sand, stone or any convenient material.

To prevent the dump from leaving its bearings when tilted I have provided the eye bolts R, which will hold the parts so that they cannot be displaced or separated. If pin bearings were used this would not be necessary.

In operating my dump the cars are run upon it and adjusted for dumping by freeing the load so that it may slide off when the dump is tilted. The lever L, is then released and by it the toggle joints are broken. The weights of the counter balances at O, are so adjusted that the unbalanced weight of the cars and their load will raise them but that they in turn will raise the empty cars. When the lever L, is pulled, thus breaking the toggle joints, the dump will be tilted to the position shown in dotted lines and the logs or whatever the load is, will slide off. As soon as the load is off the car the counter balances will bring the dump and the car back to a horizontal position. The lever L, is then locked and the empty cars run off and other loaded cars run on.

It is obvious that numerous means for holding the track horizontal while the cars are being run on and off of this tilting section of the track might be used other than the toggle joint shown. The underlying principle is the pivoting of this tilting section to one side of the center of the space between the track rails and use of counterweights so adjusted that the track will tilt under loaded cars but will be returned to the horizontal position when unloaded.

To prevent the dumping from derailing the cars a bumper beam P, is placed alongside the dump at such a height that the lower outer edge of the bolster or of the car platform will catch in the notch or recess P', in its upper surface. This prevents it from dropping any farther or from sliding sidewise.

Having thus described my invention, what I claim, and desire to secure by Letters Patent, is—

1. In an automatic dump for cars the combination with a section of track of pivoted bearings to one side of the center, counterweights on the same side of the center, said counterweights being so adjusted as to permit the track to tip sidewise under the weight of loaded cars but to return the same to a horizontal position when the cars are unloaded, of toggles supporting the unbalanced weight of the loaded cars and means for holding said toggles in their extended position and of breaking the joints at will, substantially as shown and described.

2. In an automatic dump for cars the combination with a section of track of pivoted bearings to one side of the center, counterweights on the same side of the center, said counterweights being so adjusted as to permit the track to tip sidewise under the weight of loaded cars but to return the same to a horizontal position when the cars are unloaded, of the toggles supporting the unbalanced weight of the loaded cars, and rods and levers connected to these toggles whereby they may be held in their extended position and the joints broken at will, substantially as shown and described.

3. In an automatic dump for cars the combination, with a section of track supported on knife edge bearings located to one side of the center, independent eye bolts connecting the upper and lower portions of the dump to prevent the bearings from separating, counterweights on the same side of the center, said counterweights being so adjusted as to permit the track to tip sidewise under the weight of loaded cars but to return the same to a horizontal position when the cars are unloaded, means for holding the track in a horizontal position and for releasing it when desired, substantially as shown and described.

4. In an automatic dump for cars the combination with a section of track of pivoted bearings on one side of the center, counterweights on the same side of the center, said counterweights being so adjusted as to permit the track to tip sidewise under the weight of loaded cars but to return the same to a horizontal position when the cars are unloaded, of a series of toggles supporting the unbalanced weight of the loaded cars, a shaft carrying cranks, links connecting each crank with the center joint of its corresponding toggle and means whereby the said shaft may be operated to maintain the toggles extended or to break their joints, substantially as shown and described.

In testimony whereof I affix my signature in presence of two witnesses.

C. D. MATHENY.

Witnesses:
J. P. MILLETT,
JOHN A. MACMARTIN.